(12) United States Patent
Yamagishi et al.

(10) Patent No.: US 8,012,556 B2
(45) Date of Patent: Sep. 6, 2011

(54) ACRYLIC RUBBER COMPOSITION AND ITS VULCANIZED PRODUCT

(75) Inventors: Uichiro Yamagishi, Itoigawa (JP);
Toshiaki Miyauchi, Itoigawa (JP);
Yasushi Abe, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/517,711

(22) PCT Filed: Dec. 4, 2007

(86) PCT No.: PCT/JP2007/073424
§ 371 (c)(1),
(2), (4) Date: Jun. 4, 2009

(87) PCT Pub. No.: WO2008/069218
PCT Pub. Date: Jun. 12, 2008

(65) Prior Publication Data
US 2010/0009105 A1  Jan. 14, 2010

(30) Foreign Application Priority Data
Dec. 5, 2006  (JP) .................................. 2006-328076

(51) Int. Cl.
*B29D 22/00* (2006.01)
*B29D 23/00* (2006.01)
*B32B 1/08* (2006.01)

(52) U.S. Cl. .................. 428/36.8; 428/36.9; 525/329.7; 525/329.9; 525/330.3; 525/330.5; 525/374

(58) Field of Classification Search .................. 428/36.9, 428/36.8; 525/329.7, 329.9, 330.3, 330.5, 525/374
See application file for complete search history.

(56) References Cited

U.S. PATENT DOCUMENTS

| | | | |
|---|---|---|---|
| 6,015,860 A | 1/2000 | Kuzumaki et al. | |
| 6,689,843 B2 * | 2/2004 | Kubota et al. | 525/329.7 |
| 2002/0037970 A1 | 3/2002 | Moriyama et al. | |
| 2004/0110905 A1 | 6/2004 | Kubota et al. | |
| 2004/0266922 A1 | 12/2004 | Kanba et al. | |

FOREIGN PATENT DOCUMENTS

| | | |
|---|---|---|
| JP | 11 80488 | 3/1999 |
| JP | 11 100478 | 4/1999 |
| JP | 11 269336 | 10/1999 |
| JP | 2002 265737 | 9/2002 |
| JP | 2003 201380 | 7/2003 |
| JP | 2003 268186 | 9/2003 |

OTHER PUBLICATIONS

U.S. Appl. No 12/665,105, filed Dec. 17, 2009, Yamagishi et al.

* cited by examiner

*Primary Examiner* — Michael C Miggins
(74) *Attorney, Agent, or Firm* — Oblon, Spivak, McClelland, Maier & Neustadt, L.L.P.

(57) ABSTRACT

The present invention provides an acrylic rubber composition and its vulcanized product, having good vulcanization characteristics and an excellent balance between processability, mechanical properties of rubber and compression set.

The acrylic rubber composition comprises a carboxyl group-containing acrylic rubber, a diazabicycloalkene compound, a polyamine compound, and a tertiary amine compound represented by the following formula (1):

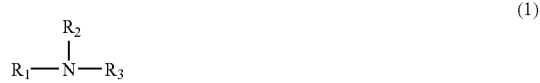

where each of $R_1$, $R_2$ and $R_3$ is independently a substituent having at least one saturated aliphatic hydrocarbon or unsaturated aliphatic hydrocarbon having a linear structure, a branched structure or a cyclic structure, or benzyl group.

11 Claims, No Drawings

ACRYLIC RUBBER COMPOSITION AND ITS VULCANIZED PRODUCT

TECHNICAL FIELD

The present invention relates to an acrylic rubber composition and its vulcanized product, having good vulcanization characteristics and an excellent balance between processability, mechanical properties of rubber and compression set.

BACKGROUND ART

Since an acrylic rubber composition is excellent in heat resistance and oil resistance, it is used for hose parts and sealing articles in an engine room of a vehicle. However, there is a demand for greater heat resistance than ever because thermal conditions become severer due to recent exhaust emission controls, a trend toward higher output power of engine, and so on.

Furthermore, the hose parts, the sealing articles and others are required to have appropriate physical properties such as normal-state properties and compression set, and are recently further required to improve a vulcanization rate for a purpose of improved productivity and a scorch property for a purpose of improved processability.

In order to deal with these requirements, an acrylic rubber composition having a carboxyl group as a crosslinking site is known as a material with balanced properties of processability, a vulcanization rate, normal-state properties, compression set and heat resistance (for example, cf. Patent Document 1).

Patent Document 1: JP-A-11-100478

DISCLOSURE OF THE INVENTION

Object to be Accomplished by the Invention

Although the acrylic rubber composition having a carboxyl group as a crosslinking site is valued as a material with balanced properties of processability, vulcanization rate, normal-state properties, compression set and heat resistance, a further improvement in the heat resistance is required because a trend toward severer operation conditions.

An object of the present invention is to provide an acrylic rubber composition and its vulcanized product, having good vulcanization characteristics and an excellent balance between processability, mechanical properties of rubber and compression set.

Means to Accomplish the Object

The present invention resides in the following aspects.
(1) An acrylic rubber composition comprising a carboxyl group-containing acrylic rubber, a diazabicycloalkene compound, a polyamine compound, and a tertiary amine compound represented by the following formula (1)

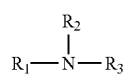

(1)

where each of $R_1$, $R_2$ and $R_3$ is independently a substituent having at least one saturated aliphatic hydrocarbon or unsaturated aliphatic hydrocarbon having a linear structure, a branched structure or a cyclic structure, or benzyl group.

(2) The acrylic rubber composition according to the above (1), wherein the diazabicycloalkene compound, the polyamine compound and the tertiary amine compound are contained in an amount of from 0.1 to 7 parts by mass, in an amount of from 0.1 to 10 parts by mass and in an amount of from 0.1 to 10 parts by mass, respectively, to 100 parts by mass of the carboxyl group-containing acrylic rubber.
(3) The acrylic rubber composition according to the above (1) or (2), wherein the diazabicycloalkene compound is at least one compound selected from the group consisting of 2,3,4,6,7,8,9,10-octahydropyrimido(1,2-a)azepine and 2,3,4,6,7,8-hexahydropyrrolo[1,2-a]pyrimidine.
(4) The acrylic rubber composition according to any one of the above (1) to (3), wherein the polyamine compound is at least one compound selected from the group consisting of an aromatic polyamine and an aliphatic polyamine.
(5) The acrylic rubber composition according to any one of the above (1) to (4), wherein the tertiary amine compound is at least one selected from the group consisting of dimethyloctylamine, dimethyldecylamine, dimethyldodecylamine, dimethyllaurylamine, dimethylmyristylamine, dimethylpalmitylamine, dimethylstearylamine, dimethylbehenylamine, dilaurylmonomethylamine, trioctylamine, methyldioleylamine, methyldidecylamine, tri-t-butylamine, tri-1-propylamine, tricyclohexylamine, tribenzylamine, trimethylamine, tri-n-butylamine, tri-n-pentylamine, tri-n-hexylamine and tri-n-heptylamine.
(6) The acrylic rubber composition according to any one of the above (1) to (5), wherein the polyamine compound is an aromatic polyamine represented by the following formula (2):

(2)

where M is O, S, $SO_2$, CONH or O—R-0; R in O—R—O is Ph, Ph-Ph, Ph-$SO_2$-Ph, $(CH_2)_m$ (m is from 3 to 5), Ph-$CH_2$—$C(CX_3)_2$—$CH_2$-Ph (X is H or F) or $(CH_2)C(CH_3)_2(CH_2)$; Ph is a benzene ring.
(7) The acrylic rubber composition according to any one of the above (1) to (6), wherein the polyamine compound is at least one selected from the group consisting of an aromatic polyamine of 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide or bis[4-(4-aminophenoxy)phenyl]sulfone; and an aliphatic polyamine of hexamethylenediamine, hexamethylenediamine carbamate, N,N'-dicinnamylidene-1,6-hexanediamine, diethylenetriamine, triethylenetetramine or tetraethylenepentamine.
(8) A vulcanized product obtained by vulcanizing the acrylic rubber composition as defined in any one of the above (1) to (7).
(9) A rubber hose comprising the vulcanized product as defined in the above (8).
(10) A sealing article comprising the vulcanized product as defined in the above (8).
(11) A rubber vibration insulator comprising the vulcanized product as defined in the above (8).

EFFECT OF THE INVENTION

The present invention provides the acrylic rubber composition and its vulcanized product, having good vulcanization characteristics and an excellent balance between processability, mechanical properties of rubber and compression set.

BEST MODE FOR CARRYING OUT THE INVENTION

The acrylic rubber composition of the present invention is obtained by blending a carboxyl group-containing acrylic rubber, a diazabicycloalkene compound, a polyamine compound, and a tertiary amine compound with a specific structure.

The above-mentioned carboxyl group-containing acrylic rubber is preferably a copolymer of an unsaturated monomer such as an acrylic acid alkyl ester, and a carboxyl group-containing unsaturated aliphatic acid. The copolymer is obtained by one of conventionally known methods such as emulsion polymerization, suspension polymerization, solution polymerization and bulk polymerization.

Examples of the above-mentioned acrylic acid alkyl ester include methyl acrylate, ethyl acrylate, n-propyl acrylate, isobutyl acrylate, n-butyl acrylate, n-pentyl acrylate, n-hexyl acrylate, n-octyl acrylate, 2-ethylhexyl acrylate, and so on.

Further examples of the above-mentioned acrylic acid alkyl ester to be used include n-decyl acrylate, n-dodecyl acrylate, n-octadecyl acrylate, cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate, 8-cyanooctyl acrylate, and so on.

Examples of the above-mentioned acrylic acid alkyl ester to be used include acrylic acid alkoxy alkyl esters such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy) propyl acrylate and 2-(n-butoxy)propyl acrylate, and so on.

Further examples of the above-mentioned acrylic acid alkyl ester to be used include fluorine-containing acrylic acid esters such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth) acrylate, 1,1-dihydroperfluorooctyl(meth)acrylate and 1,1-dihydroperfluorodecyl(meth)acrylate; hydroxyl group-containing acrylic acid esters such as 1-hydroxypropyl(meth) acrylate, 2-hydroxypropyl (meth)acrylate and hydroxyethyl (meth)acrylate; tertiary amino group-containing acrylic acid esters such as diethylaminoethyl(meth)acrylate and dibutylaminoethyl (meth)acrylate; and methacrylates such as methyl methacrylate and octyl methacrylate.

The above-mentioned acrylic acid alkyl esters may be used singly or in combination of two or more monomers.

There are no particular restrictions on the above-mentioned carboxyl group-containing unsaturated aliphatic acid. Examples thereof include unsaturated carboxylic acids such as acrylic acid and methacrylic acid; aliphatic unsaturated dicarboxylic acids such as maleic acid, fumaric acid, itaconic acid and citraconic acid; aliphatic unsaturated dicarboxylic acid monoesters such as monomethyl maleate, monoethyl maleate, mono-n-propyl maleate, monoisopropyl maleate, mono-n-butyl maleate, monoisobutyl maleate, monomethyl fumarate, monoethyl fumarate, mono-n-propyl fumarate, monoisopropyl maleate, mono-n-butyl fumarate, monomethyl itaconate, monoethyl itaconate, mono-n-propyl itaconate, mono-n-propyl citraconate, mono-n-butyl citraconate and monoisobutyl citraconate, and so on. These compounds may be used singly or in combination of two or more thereof.

The above-mentioned carboxyl group-containing unsaturated aliphatic acid is preferably copolymerized in such an amount that the rate thereof becomes from 0.1 to 20 mass % and preferably from 0.1 to 10 mass % in the resulting carboxyl group-containing acrylic rubber because the vulcanization characteristics of the carboxyl group-containing acrylic rubber are improved.

A monomer with any crosslinking site other than the acrylic acid alkyl ester, or any other copolymerizable monomer may be copolymerized in the above-mentioned carboxyl group-containing acrylic rubber in accordance with its intended use as long as the effect of the present invention is not impaired.

Examples of the monomer with any crosslinking site other than the acrylic acid alkyl ester include a carboxylic group-containing compounds such as acrylic acid, methacrylic acid, crotonic acid, 2-pentenic acid, maleic acid, fumaric acid and itaconic acid; epoxy group-containing compounds such as glycidyl acrylate, glycidyl methacrylate, allyl glycidyl ether and methallyl glycidyl ether; and active chlorine-containing compounds such as 2-chloroethyl vinyl ether, 2-chloroethyl acrylate, vinylbenzyl chloride, vinyl chloroacetate and allyl chloroacetate. These compounds may be used singly or in combination of two or more monomers.

The monomer with a crosslinking site is preferably copolymerized in such a blending amount that the rate thereof becomes from 0.05 to 15 mass % and preferably from 0.1 to 10 mass % in the resulting carboxyl group-containing acrylic rubber.

Examples of the above-mentioned copolymerizable monomer include alkyl vinyl ketones such as methyl vinyl ketone; vinyl and allyl ethers such as vinyl ethyl ether and allyl methyl ether; vinyl aromatic compounds such as styrene, α-methylstyrene, chlorostyrene, vinyltoluene and vinylnaphthalene; vinylnitriles such as acrylonitrile and methacrylonitrile; and ethylenic unsaturated compounds such as acrylamide, vinyl acetate, ethylene, propylene, butadiene, isoprene, pentadiene, vinyl chloride, vinylidene chloride, vinyl fluoride, vinylidene fluoride, vinyl propionate and alkyl fumarate.

The other copolymerizable monomer is preferably copolymerized in such a blending amount that the rate thereof becomes from 0.05 to 15 mass % and preferably from 0.1 to 10 mass % in the resulting carboxyl group-containing acrylic rubber.

There are no particular restrictions on the diazabicycloalkene compound contained in the acrylic rubber composition of the present invention as long as the compound has a diazabicycloalkene structure. Examples of the compound include 2,3,4,6,7,8,9,10-octahydropyrimido[1,2-a]azepine (1,8-diazabicyclo[5.4.0]undec-7-ene), 6-butyl-2,3,4,6,7,8,9,10-octahydropyrimido[1,2-a]azepine, 6-octadecyl-2,3,4,6,7,8,9,10-octahydropyrimido[1,2-a]azepine, 2,2'-[(2,3,4,6,7,8,9,10-octahydropyrimido[1,2-a]azepin-10-yl)imido] bisethanol, 1-[2-(2,2-dimethylpropyl)-6,6-dimethyl-2-heptenyl]-2,3,4,6,7,8,9,10-octahydropyrimido[1,2-a] azepinium, 1-carboxy-2,3,4,6,7,8,9,10-octahydropyrimido [1,2-a]azepinium, 2,3,4,6,7,8,9,10-octahydro-1-pentylpyrimido[1,2-a]azepinium, 2,3,4,6,7,8,9,10-octahydropyrimido[1,2-a]azepine-10-carboxylic acid, 1-(chlorocarbonyl)-2,3,4,6,7,8,9,10-octahydropyrimido[1, 2-a]azepinium, 1-heptyl-2,3,4,6,7,8,9,10-octahydropyrimido[1,2-a]azepinium, 1-heptadecyl-2,3,4,6,7,8,9,10-octahydropyrimido[1,2-a]azepinium, 1-decyl-2,3,4,6,7,8,9,10-octahydropyrimido[1,2-a]azepinium, 1-hexyl-2,3,4,6,7,8,9, 10-octahydropyrimido[1,2-a]azepinium, 1-(3-chloropropyl)-2,3,4,6,7,8,9,10-octahydropyrimido[1,2-a] azepinium, 1-[2-(diethylamino)ethyl]-2,3,4,6,7,8,9,10- octahydropyrimido[1,2-a]azepinium, 2,3,4,6,7,8,9,10-octahydro-1-tetraeicosylpyrimido[1,2-a]azepinium, 2,3,4,6,7,8,9,10-octahydro-1-nonylpyrimido[1,2-a]azepinium, 1-butyl-2,3,4,6,7,8,9,10-octahydropyrimido[1,2-a]azepinium, 2,3,4,6,7,8,9,10-octahydro-1-(methoxycarbonyl)-pyrimido[1,2-a]azepinium, 2,3,4,6,7,8,9,10-octahydro-α-methyl-pyrimido[1,2-a]azepine-10-ethanol, 2,3,4,6,7,8,9,10-octahydropyrimido[1,2-a]azepine-10-ethanol, 2,3,4,6,7,8,9,10-octahydro-1-octylpyrimido[1,2-a]azepinium, N-butyl-2,3,4,6,7,8,9,10-octahydropyrimido[1,2-a]azepine-10-amine, 1-ethyl-2,3,4,6,7,8,9,10-octahydropyrimido[1,2-a]azepinium, 2,3,4,6,7,8,9,10-octahydro-10-octylpyrimido[1,2-a]azepine, 2,3,4,6,7,8,9,10-octahydro-N,N-dipropyl[1,2-a]azepine-10-amine, 1-(2-butenyl)-2,3,4,6,7,8,9,10-octahydropyrimido[1,2-a]azepinium, 2,3,4,6,7,8,9,10-octahydropyrimido[1,2-a]azepine-10-amine, N,N'-dibutyl-2,3,4,6,7,8,9,10-octahydropyrimido[1,2-a]azepine diamine, 2,3,4,6,7,8,9,10-octahydro-6-methylpyrimido[1,2-a]azepine, 2,3,4,6,7,8,9,10-octahydro-10-pentadecylpyrimido[1,2-a]azepine, 2,3,4,6,7,8,9,10-octahydro-N-methyl-N-octylpyrimido[1,2-a]azepine-10-amine, N,N-dibutyl-2,3,4,6,7,8,9,10-octahydropyrimido[1,2-a]azepine-10-amine, 2,3,4,6,7,8,9,10-octahydro-N,N'-dimethylpyrimido[1,2-a]azepine-10-amine, 10-chloro-2,3,4,6,7,8,9,10-octahydropyrimido[1,2-a]azepine, 1-eicosyl-2,3,4,6,7,8,9,10-octahydropyrimido[1,2-a]azepinium, 2,3,4,6,7,8,9,10-octahydro-1-tetradecylpyrimido[1,2-a]azepinium, 1-dodecyl-2,3,4,6,7,8,9,10-octahydropyrimido[1,2-a]azepinium, 1-hexadecyl-2,3,4,6,7,8,9,10-octahydropyrimido[1,2-a]azepinium, 2-ethylhexanoate of 1,8-diazabicyclo[5.4.0]undec-7-ene, bromate of 1,8-diazabicyclo[5.4.0]undec-7-ene, phenolate of 1,8-diazabicyclo[5.4.0]undec-7-ene, p-toluenesulfonate of 1,8-diazabicyclo[5.4.0]undec-7-ene, 2,3,4,6,7,8-hexahydropyrrolo[1,2-a]pyrimidine (1,5-diazabicyclo[4.3.0]non-5-ene), 4-butyl-2,3,4,6,7,8-hexahydropyrrolo[1,2-a]pyrimidine, 2,3,4,6,7,8-hexahydro-4,7,8-trimethylpyrrolo[1,2-a]pyrimidine, 2,3,4,6,7,8-hexahydro-4-methylpyrrolo[1,2-a]pyrimidine, 2,3,4,6,7,8-hexahydropyrrolo[1,2-a]pyrimidine-6-carboxylic acid phenylmethyl ester, 2,3,4,6,7,8-hexahydro-8-(phenylmethoxy)-pyrrolo[1,2-a]pyrimidine, 2,3,4,6,7,8-hexahydropyrrolo[1,2-a]pyrimidine-8-ethanol, 2,3,4,6,7,8-hexahydro-α-methylpyrrolo[1,2-a]pyrimidine-8-ethanol, 2,3,4,6,7,8-hexahydro-7,7,8-trimethylpyrrolo[1,2-a]pyrimidine, 2,3,4,6,7,8-hexahydro-3-methylpyrrolo[1,2-a]pyrimidine-3-methane amine, 2,3,4,6,7,8-hexahydropyrrolo[1,2-a]pyrimidine-3-amine, 2,3,4,6,7,8-hexahydropyrrolo-8-methyl[1,2-a]pyrimidine, 2,3,4,6,7,8-hexahydropyrrolo-3-phenyl[1,2-a]pyrimidine, 6-(aminomethyl)-2,3,4,6,7,8-hexahydro-6,8,8-trimethylpyrrolo[1,2-a]pyrimidine, 2,3,4,6,7,8-hexahydro-6,8,8-trimethylpyrrolo[1,2-a]pyrimidine, 2,3,4,6,7,8-hexahydro-2,4,7-triphenylpyrrolo[1,2-a]pyrimidin-2-ol, 2,3,4,6,7,8-hexahydro-4,7-diphenylpyrrolo[1,2-a]pyrimidin-2-ol, 2,3,4,6,7,8-hexahydro-2,4,4-trimethyl-7-phenylpyrrolo[1,2-a]pyrimidin-2-ol, 2,3,4,6,7,8-hexahydro-2,3-dimethyl-7-phenylpyrrolo[1,2-a]pyrimidin-2-ol, 8,8-dichloro-2,3,4,6,7,8-hexahydropyrrolo[1,2-a]pyrimidine, 8-chloro-2,3,4,6,7,8-hexahydropyrrolo[1,2-a]pyrimidine, 2,3,4,6,7,8-hexahydro-α-phenylpyrrolo[1,2-a]pyrimidine-8-methanol, 2,3,4,6,7,8-hexahydro-3-methylenepyrrolo[1,2-a]pyrimidine, 2,3,4,6,7,8-hexahydro-6-(phenylmethylene)-pyrrolo[1,2-a]pyrimidine, 2,3,4,6,7,8-hexahydro-6-methylpyrrolo[1,2-a]pyrimidine, 2,3,4,6,7,8-hexahydro-7-methylpyrrolo[1,2-a]pyrimidine, 2,3,4,6,7,8-hexahydro-7,7-diphenylpyrrolo[1,2-a]pyrimidine, 2,3,4,6,7,8-hexahydro-8,8-diphenylpyrrolo[1,2-a]pyrimidine, 2,3,4,6,7,8-hexahydro-6-tridecylpyrrolo[1,2-a]pyrimidine, 6-heptyl-2,3,4,6,7,8-hexahydropyrrolo[1,2-a]pyrimidine, 6-hexyl-2,3,4,6,7,8-hexahydropyrrolo[1,2-a]pyrimidine, 2,3,4,6,7,8-hexahydro-6-pentylpyrrolo[1,2-a]pyrimidine, 2,3,4,6,7,8-hexahydro-6-(2-methylpropyl)-pyrrolo[1,2-a]pyrimidine, 6-butyl-2,3,4,6,7,8-hexahydropyrrolo[1,2-a]pyrimidine, 2,3,4,6,7,8-hexahydro-6-propylpyrrolo[1,2-a]pyrimidine, 2,3,4,6,7,8-hexahydro-2-phenylpyrrolo[1,2-a]pyrimidine, 2,3,4,6,7,8-hexahydro-2,4-diphenylpyrrolo[1,2-a]pyrimidin-2-ol, 2,3,4,6,7,8-hexahydro-3-methylpyrrolo[1,2-a]pyrimidin-2-ol, 2,3,4,6,7,8-hexahydro-2-methylpyrrolo[1,2-a]pyrimidin-2-ol, 2,3,4,6,7,8-hexahydro-4-phenylpyrrolo[1,2-a]pyrimidin-2-ol, 2,3,4,6,7,8-hexahydro-2,4,4-trimethylpyrrolo[1,2-a]pyrimidin-2-ol, 2,3,4,6,7,8-hexahydro-4-methylpyrrolo[1,2-a]pyrimidin-2-ol, 2,3,4,6,7,8-hexahydro-6-pentylpyrrolo[1,2-a]pyrimidine, 2,3,4,6,7,8-hexahydro-8,8-dimethyl-6-methylenepyrrolo[1,2-a]pyrimidine, and so on. These compounds may be used singly or in combination of two or more thereof.

A blending amount of the above diazabicycloalkene compound is in a range of from 0.1 to 7 parts by mass, preferably in a range of from 0.2 to 5 parts by mass, to 100 parts by mass of the above carboxyl group-containing acrylic rubber. When the blending amount is within this range, the acrylic rubber composition is vulcanized in a necessary and sufficient degree so that the resulting acrylic rubber composition can be improved in the mechanical properties and compression set at high temperatures.

The polyamine compound contained in the acrylic rubber composition of the present invention is at least one compound selected from the group consisting of an aromatic polyamine and an aliphatic polyamine.

The above-mentioned aromatic polyamine compound is a compound represented by the following formula (2), without any particular restrictions thereon:

$$H_2N\text{-}Ph\text{-}M\text{-}Ph\text{-}NH_2 \qquad (2)$$

where M is O, S, $SO_2$, CONH or O—R—O; R in O—R—O is Ph, Ph-Ph, Ph-$SO_2$-Ph, $(CH_2)_m$ (m is from 3 to 5), Ph-$CH_2$—C(C$X_3$)$_2$—$CH_2$-Ph (X is H or F) or $(CH_2)C(CH_3)_2(CH_2)$; Ph is a benzene ring.

There are no particular restrictions on the above aromatic polyamine compound, and examples thereof include 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide, bis[4-(4-aminophenoxy)phenyl]sulfone, and so on.

There are no particular restrictions on the above aliphatic polyamine compound, and examples thereof include hexamethylenediamine, hexamethylenediamine carbamate, N,N'-dicinnamylidene-1,6-hexanediamine, diethylenetriamine, triethylenetetramine, tetraethylenepentamine, and so on. These compounds may be used singly or in combination of two or more thereof.

A blending amount of the above polyamine compound is in a range of from 0.1 to 10 parts by mass, preferably in a range of from 0.3 to 5 parts by mass, to 100 parts by mass of the above carboxyl group-containing acrylic rubber. When the blending amount is within this range, the acrylic rubber composition is vulcanized in a necessary and sufficient degree so that the resulting acrylic rubber composition can be improved in the mechanical properties and compression set at high temperatures.

The tertiary amine compound contained in the acrylic rubber composition of the present invention is represented by the following formula (1).

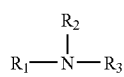
(1)

There are no particular restrictions on the tertiary amine compound as long as it is a compound wherein each of three substituents $R_1$, $R_2$ and $R_3$ in the formula is independently at least one substituent selected from the group consisting of an alkyl group, a cycloalkyl group and a benzyl group. Examples of the amine include dimethyloctylamine, dimethyldecylamine, dimethyldodecylamine, dimethyllaurylamine, dimethylmyristylamine, dimethylpalmitylamine, dimethylstearylamine, dimethylbehenylamine, dilaurylmonomethylamine, trioctylamine, methyldioleylamine, methyldidecylamine, tri-t-butylamine, tri-1-propylamine, tricyclohexylamine, tribenzylamine, trimethylamine, tri-n-butylamine, tri-n-pentylamine, tri-n-hexylamine, tri-n-heptylamine, and so on.

An addition amount of the above tertiary amine compound is in a range of from 0.1 to 10 parts by mass, preferably from 0.2 to 5 parts by mass, to 100 parts by mass of the above carboxyl group-containing acrylic rubber. The blending amount is preferably within this range because vulcanization promoting performance can be achieved while preventing the tertiary amine compound from bleeding out on a surface of the acrylic rubber composition after vulcanization.

For application of the acrylic rubber composition to practical use, molding and vulcanization can be conducted with addition of a filler, a reinforcing agent, a plasticizer, an anti-aging agent, a stabilizer, a lubricant or the like depending on its purpose of application.

The filler and the reinforcing agent can be those conventionally used for rubber, without any particular restrictions thereon. Examples thereof include carbon black, silicic acid anhydride such as silica, surface-treated calcium carbonate, and so on. The filler and/or the reinforcing agent may be used singly or in combination of two or more kinds. An addition amount of the filler and/or the reinforcing agent is from 20 to 150 parts by mass, preferably from 30 to 100 parts by mass in total, to 100 parts by mass of the acrylic rubber composition.

The plasticizer can be any one of various types of plasticizers conventionally used for rubber, without any particular restrictions thereon. Examples thereof include an ester type plasticizer, an ether type plasticizer such as polyoxyethylene ether, and so on. These plasticizers may be used singly or in combination of two or more kinds. An addition amount of the plasticizer is preferably at most 75 parts by mass, more preferably at most 50 parts by mass, to 100 parts by mass of the acrylic rubber composition.

The anti-aging agent can be any one of those conventionally used for rubber, without any particular restrictions thereon. Examples thereof include an amine type, an imidazole type, a metal salt of carbamic acid, a phenol type, a wax, and so on. An addition amount of the anti-aging agent is preferably from 0.1 to 15 parts by mass, more preferably from 0.5 to 10 parts by mass, to 100 parts by mass of the acrylic rubber composition.

A rubber component in the acrylic rubber composition is mainly composed of the carboxyl group-containing acrylic rubber, but a natural rubber or a synthetic rubber such as IIR, BR, NBR, HNBR, CR, EPDM, FKM, Q, CSM, CO, ECO or CM may be blended, if necessary, in addition to the carboxyl group-containing acrylic rubber. It is noted that these abbreviations are based on ISO1629.

The acrylic rubber composition of the present invention is produced by blending and mixing the above-mentioned components and a method thereof is one of conventional methods. For example, the mixing is conducted using a mixing machine such as a Banbury mixer or a roll mill, preferably, at a temperature of from 10 to 80° C., preferably, for from 3 to 30 minutes. Conventional methods are also used for obtaining a vulcanized product from the acrylic rubber composition of the present invention. Namely, when the acrylic rubber composition of the present invention is kneaded, molded and vulcanized, machines and conditions adopted therefor are those conventionally used in the rubber field.

The acrylic rubber composition and its vulcanized product are used, particularly, for rubber hoses, sealing articles such as gaskets and packings, and vibration-proofing parts. Specific examples of the rubber hoses include a transmission oil cooler hose, an engine oil cooler hose, a turbo intercooler hose, a turbo air duct hose, a power steering hose, a hot air hose, a radiator hose; hoses for an oil system and a fuel system including a high pressure system, and a drain system hose in other industrial machines and building machines, and so on.

Specific examples of the sealing articles include an engine head cover gasket, an oil pan gasket, an oil seal, a lip seal packing, an O-ring, a transmission seal gasket, a seal gasket of a crankshaft or a camshaft, valve stem, a power steering seal, a belt cover seal, a boot material for CVJ (constant velocity joint) or R&P (rack and pinion), and others.

Examples of rubber vibration insulator include a damper pulley, a center support cushion, a suspension bush, an engine mount, and so on.

Particularly, the acrylic rubber composition and its vulcanized product of the present invention have excellent mechanical properties and also have excellent cold resistance, oil resistance and heat resistance, so that they can be quite suitably used as a rubber hose for automobile, or as an oil sealing product such as a gasket, which recently tends to be used in a severer environment.

A structure of a rubber hose may be a single hose obtained from the acrylic rubber composition of the present invention. Furthermore, according to an application thereof, the structure may be a composite hose obtained by combining a layer composed of the acrylic rubber composition of the present invention with any synthetic rubber other than the acrylic rubber of the present invention, e.g., fluorine type rubber, fluorine-modified acrylic rubber, hydrin rubber, CSM, CR, NBR, HNBR or ethylene-propylene rubber, as an inner layer, an intermediate layer or an outer layer.

Furthermore, depending on properties required for the rubber hose, it is possible to provide an intermediate or outermost layer of the rubber hose with a reinforcing fiber or wire, as is generally commonly carried out.

EXAMPLES

Now, the present invention is explained further in detail referring to examples, but it should be understood that the present invention is by no means construed as restricted to these examples.

<Production of Carboxyl Group-containing Acrylic Rubber 1>

100 parts by mass of an acrylic rubber (Denka ER-A403 manufactured by Denki Kagaku Kogyou K.K.), 1 part by mass of stearic acid, 1 part by mass of 4,4-bis(α,α-dimethylbenzyl)diphenylamine, 50 parts by mass of carbon black (FEF; Asahi #609 manufactured by Asahi Carbon Co. Ltd.), 0.3 part by mass of stearylamine and 1 part by mass of liquid paraffin were kneaded with eight-inch rolls to obtain carboxyl group-containing acrylic rubber 1.

<Production of Carboxyl Group-containing Acrylic Rubber 2>

100 parts by mass of an acrylic rubber (VAMAC G manufactured by Dupont K.K.), 1 part by mass of stearic acid, 1 part by mass of 4,4-bis(α,α-dimethylbenzyl)diphenylamine, 50 parts by mass of carbon black (FEF; Asahi #609 manufactured by Asahi Carbon Co. Ltd.), 0.3 part by mass of stearylamine and 1 part by mass of liquid paraffin were kneaded with eight-inch rolls to obtain carboxyl group-containing acrylic rubber 2.

Example 1

In 100 parts by mass of the carboxyl group-containing acrylic rubber 1, 1.0 part by mass of 2,2-bis[4-(4-aminophenoxy)phenyl]propane, 0.5 part by mass of trioctylamine and 0.1 part by mass of 1,8-diazabicyclo[5.4.0]undec-7-ene) were added to obtain an acrylic rubber composition.

The acrylic rubber composition thus obtained was evaluated with respect to a scorch time (t5) at a test temperature of 125° C. using an L-shape rotor in accordance with JIS K6300.

<Vulcanization>

The acrylic rubber composition thus obtained was subjected to a heat treatment at 170° C. for 20 minutes using an electrically heating press, to obtain a primary vulcanized product. The primary vulcanized product thus obtained was further subjected to a heat treatment at 170° C. in a gear oven for 4 hours to obtain a secondary vulcanized product.

The primary product and the secondary product were evaluated with respect to 100% modulus, tensile strength and elongation in accordance with JIS K6251 and also evaluated with respect to hardness using a durometer in accordance with JIS K6253. Furthermore, the secondary vulcanized product thus obtained was evaluated with respect to compression set at 150° C. for 70 hours in accordance with JIS K6262.

Examples 2 to 18 and Comparative Examples 1 to 11

An acrylic rubber composition, a primary vulcanized product and a secondary vulcanized product were produced in the same manner as in Example 1, based on the blending amounts (part(s) by mass) as shown in Tables 1 to 5, and evaluated in the same manner as in Example 1.

TABLE 1

| | | | Ex. 1 | Ex. 2 | Ex. 3 | Ex. 4 | Ex. 5 | Ex. 6 |
|---|---|---|---|---|---|---|---|---|
| Carboxyl group-containing acrylic rubber 1 | | | 100 | 100 | 100 | 100 | 100 | 100 |
| Carboxyl group-containing acrylic rubber 2 | | | — | — | — | — | — | — |
| 2,2-bis[4-(4-aminophenoxy)phenyl]propane | | | 1.0 | 1.0 | 1.0 | 1.0 | 1.0 | 1.0 |
| Hexamethylenediamine carbamate | | | — | — | — | — | — | — |
| Trioctylamine | | | 0.5 | 0.5 | 1.0 | 1.0 | 1.5 | 1.5 |
| N,N-dimethyldodecan-1-amine | | | — | — | — | — | — | — |
| 1,8-diazabicyclo[5.4.0]undec-7-ene | | | 0.1 | 0.3 | 0.2 | 0.3 | 0.2 | 0.3 |
| 1,5-diazabicyclo[4.3.0]non-5-ene | | | — | — | — | — | — | — |
| Scorch time | ML t5 (125° C.) | Minutes | 21.0 | 11.4 | 15.8 | 12.2 | 17.2 | 13.6 |
| Characteristics | 100% modulus | MPa | 2.6 | 3.5 | 3.0 | 3.2 | 2.8 | 3.2 |
| of primary | Tensile strength | MPa | 9.8 | 10.8 | 10.5 | 10.8 | 9.9 | 10.6 |
| vulcanized | Elongation | % | 368 | 284 | 332 | 303 | 356 | 318 |
| product | Hardness | Shore A | 56 | 58 | 56 | 56 | 55 | 55 |
| Characteristics | 100% modulus | MPa | 4.1 | 5.1 | 4.3 | 4.5 | 4.3 | 4.5 |
| of secondary | Tensile strength | MPa | 11.3 | 11.5 | 11.1 | 10.8 | 11.5 | 10.8 |
| vulcanized | Elongation | % | 241 | 191 | 220 | 189 | 244 | 204 |
| product | Hardness | Shore A | 64 | 65 | 62 | 63 | 65 | 63 |
| Compression set | CS (150° C. × 70 h) | % | 15 | 17 | 15 | 17 | 20 | 15 |

TABLE 2

| | | | Ex. 7 | Ex. 8 | Ex. 9 | Ex. 10 | Ex. 11 | Ex. 12 |
|---|---|---|---|---|---|---|---|---|
| Carboxyl group-containing acrylic rubber 1 | | | 100 | 100 | 100 | 100 | 100 | 100 |
| Carboxyl group-containing acrylic rubber 2 | | | — | — | — | — | — | — |
| 2,2-bis[4-(4-aminophenoxy)phenyl]propane | | | 1.0 | 1.0 | 1.0 | 1.0 | 1.0 | 0.7 |
| Hexamethylenediamine carbamate | | | — | — | — | — | — | — |
| Trioctylamine | | | 1.5 | 1.5 | 2.0 | 2.0 | 3.0 | 1.0 |
| N,N-dimethyldodecan-1-amine | | | — | — | — | — | — | — |
| 1,8-diazabicyclo[5.4.0]undec-7-ene | | | 0.5 | 1.0 | 0.3 | 0.4 | 0.3 | 0.2 |
| 1,5-diazabicyclo[4.3.0]non-5-ene | | | — | — | — | — | — | — |
| Scorch time | ML t5 (125° C.) | Minutes | 9.1 | 8.0 | 12.4 | 10.7 | 12.6 | 16.6 |
| Characteristics | 100% modulus | MPa | 3.4 | 3.2 | 3.4 | 3.5 | 3.2 | 2.3 |
| of primary | Tensile strength | MPa | 10.6 | 10.8 | 10.4 | 10.6 | 10.0 | 9.7 |
| vulcanized | Elongation | % | 279 | 318 | 306 | 298 | 316 | 382 |
| product | Hardness | Shore A | 56 | 52 | 56 | 55 | 54 | 54 |
| Characteristics | 100% modulus | MPa | 5.0 | 4.8 | 4.4 | 4.4 | 4.3 | 3.0 |
| of secondary | Tensile strength | MPa | 11.6 | 12.0 | 11.4 | 11.3 | 11.2 | 10.6 |
| vulcanized | Elongation | % | 206 | 210 | 222 | 213 | 230 | 278 |
| product | Hardness | Shore A | 66 | 65 | 65 | 65 | 65 | 62 |
| Compression set | CS (150° C. × 70 h) | % | 16 | 18 | 17 | 17 | 17 | 16 |

TABLE 3

|  |  | | Ex. 13 | Ex. 14 | Ex. 15 | Ex. 16 | Ex. 17 | Ex. 18 |
|---|---|---|---|---|---|---|---|---|
| Carboxyl group-containing acrylic rubber 1 | | | 100 | 100 | 100 | 100 | 100 | — |
| Carboxyl group-containing acrylic rubber 2 | | | — | — | — | — | — | 100 |
| 2,2-bis[4-(4-aminophenoxy)phenyl]propane | | | 2.0 | 3.0 | 1.0 | 1.0 | — | — |
| Hexamethylenediamine carbamate | | | — | — | — | — | 0.6 | 1.3 |
| Trioctylamine | | | 1.0 | 1.0 | 1.5 | — | 1.5 | 3.1 |
| N,N-dimethyldodecan-1-amine | | | — | — | — | 0.9 | — | — |
| 1,8-diazabicyclo[5.4.0]undec-7-ene | | | 0.2 | 0.2 | — | 0.1 | 0.3 | 0.6 |
| 1,5-diazabicyclo[4.3.0]non-5-ene | | | — | — | 0.3 | — | — | — |
| Scorch time | ML t5 (125° C.) | Minutes | 17.7 | 20.1 | 11.4 | 16.9 | 4.6 | 6.6 |
| Characteristics | 100% modulus | MPa | 2.3 | 1.8 | 3.3 | 2.6 | 5.0 | 4.0 |
| of primary | Tensile strength | MPa | 10.1 | 9.4 | 10.4 | 10.3 | 11.0 | 15.4 |
| vulcanized | Elongation | % | 400 | 466 | 327 | 374 | 222 | 372 |
| product | Hardness | Shore A | 55 | 55 | 56 | 55 | 55 | 67 |
| Characteristics | 100% modulus | MPa | 8.4 | 8.8 | 4.6 | 4.4 | 6.5 | 5.6 |
| of secondary | Tensile strength | MPa | 13.4 | 13.8 | 11.6 | 10.9 | 12.6 | 18.5 |
| vulcanized | Elongation | % | 147 | 144 | 228 | 217 | 175 | 304 |
| product | Hardness | Shore A | 69 | 73 | 65 | 63 | 60 | 73 |
| Compression set | CS (150° C. × 70 h) | % | 17 | 19 | 15 | 16 | 13 | 16 |

TABLE 4

|  |  | | Comp Ex. 1 | Comp Ex. 2 | Comp Ex. 3 | Comp Ex. 4 | Comp Ex. 5 | Comp Ex. 6 |
|---|---|---|---|---|---|---|---|---|
| Carboxyl group-containing acrylic rubber 1 | | | 100 | 100 | 100 | 100 | 100 | 100 |
| Carboxyl group-containing acrylic rubber 2 | | | — | — | — | — | — | — |
| 2,2-bis[4-(4-aminophenoxy)phenyl]propane | | | 1.0 | — | — | — | 1.0 | 1.0 |
| Hexamethylenediamine carbamate | | | — | 0.6 | — | — | — | — |
| Trioctylamine | | | — | — | 1.5 | — | 1.5 | — |
| N,N-dimethyldodecan-1-amine | | | — | — | — | — | — | — |
| 1,8-diazabicyclo[5.4.0]undec-7-ene | | | — | — | — | 0.3 | — | 0.3 |
| 1,5-diazabicyclo[4.3.0]non-5-ene | | | — | — | — | — | — | — |
| Scorch time | ML t5 (125° C.) | Minutes | Not vulcanized | 4.6 | Not vulcanized | — | 29.9 | 10.8 |
| Characteristics | 100% modulus | MPa | | 4.2 | | — | 1.4 | 3.6 |
| of primary | Tensile strength | MPa | | 11.3 | | — | 8.4 | 11.0 |
| vulcanized | Elongation | % | | 264 | | — | 564 | 306 |
| product | Hardness | Shore A | | 57 | | — | 50 | 58 |
| Characteristics | 100% modulus | MPa | | 5.2 | | — | 3.3 | 5.4 |
| of secondary | Tensile strength | MPa | | 12.9 | | — | 11.0 | 10.1 |
| vulcanized | Elongation | % | | 220 | | — | 293 | 166 |
| product | Hardness | Shore A | | 62 | | — | 64 | 66 |
| Compression set | CS (150° C. × 70 h) | % | | 25 | | — | 15 | 16 |

TABLE 5

|  |  | | Comp. Ex. 7 | Comp. Ex. 8 | Comp. Ex. 9 | Comp. Ex. 10 | Comp. Ex. 11 |
|---|---|---|---|---|---|---|---|
| Carboxyl group-containing acrylic rubber 1 | | | — | — | — | — | — |
| Carboxyl group-containing acrylic rubber 2 | | | 100 | 100 | 100 | 100 | 100 |
| 2,2-bis[4-(4-aminophenoxy)phenyl]propane | | | — | — | — | — | — |
| Hexamethylenediamine carbamate | | | 1.3 | — | — | 1.3 | 1.3 |
| Trioctylamine | | | — | 3.1 | — | 3.1 | — |
| N,N-dimethyldodecan-1-amine | | | — | — | — | — | — |
| 1,8-diazabicyclo[5.4.0]undec-7-ene | | | — | — | 0.6 | — | 0.6 |
| 1,5-diazabicyclo[4.3.0]non-5-ene | | | — | — | — | — | — |
| Scorch time | ML t5 (125° C.) | Minutes | 7.3 | Not vulcanized | Not vulcanized | 8.0 | 4.9 |
| Characteristics | 100% modulus | MPa | 4.0 | | | 3.3 | 4.7 |
| of primary | Tensile strength | MPa | 14.8 | | | 15.0 | 15.6 |
| vulcanized | Elongation | % | 478 | | | 461 | 374 |
| product | Hardness | Shore A | 72 | | | 68 | 70 |
| Characteristics | 100% modulus | MPa | 5.5 | | | 4.9 | 6.8 |
| of secondary | Tensile strength | MPa | 19.2 | | | 18.3 | 19.7 |
| vulcanized | Elongation | % | 326 | | | 367 | 285 |
| product | Hardness | Shore A | 73 | | | 73 | 73 |
| Compression set | CS (150° C. × 70 h) | % | 37 | | | 22 | 14 |

INDUSTRIAL APPLICABILITY

The acrylic rubber composition of the present invention has the good vulcanization characteristics and its vulcanized product has the excellent balance between processability, mechanical properties of rubber and compression set; they are thus industrially useful for rubber hoses, sealing articles, rubber vibration insulators, and others.

The entire disclosure of Japanese Patent Application No. 2006-328076 filed on Dec. 5, 2006 including the specification, claims, and summary is incorporated herein by reference in its entirety.

The invention claimed is:

1. An acrylic rubber composition comprising a carboxyl group-containing acrylic rubber, a diazabicycloalkene compound, a polyamine compound, and a tertiary amine compound represented by formula (1):

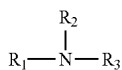 (1)

where each of $R_1$, $R_2$ and $R_3$ is independently selected from the group consisting of a substituent having at least one saturated aliphatic hydrocarbon or unsaturated aliphatic hydrocarbon having a linear structure, a branched structure or a cyclic structure, and a benzyl group.

2. The acrylic rubber composition according to claim 1, wherein the diazabicycloalkene compound, the polyamine compound and the tertiary amine compound are contained in an amount of from 0.1 to 7 parts by mass, in an amount of from 0.1 to 10 parts by mass and in an amount of from 0.1 to 10 parts by mass, respectively, to 100 parts by mass of the carboxyl group-containing acrylic rubber.

3. The acrylic rubber composition according to claim 1, wherein the diazabicycloalkene compound is at least one compound selected from the group consisting of 2,3,4,6,7,8,9,10-octahydropyrimido(1,2-a)azepine and 2,3,4,6,7,8-hexahydropyrrolo(1,2-a)pyrimidine.

4. The acrylic rubber composition according to claim 1, wherein the polyamine compound is at least one compound selected from the group consisting of an aromatic polyamine and an aliphatic polyamine.

5. The acrylic rubber composition according to claim 1, wherein the tertiary amine compound is at least one selected from the group consisting of dimethyloctylamine, dimethyldecylamine, dimethyldodecylamine, dimethyllaurylamine, dimethylmyristylamine, dimethylpalmitylamine, dimethylstearylamine, dimethylbehenylamine, dilaurylmonomethylamine, trioctylamine, methyldioleylamine, methyldidecylamine, tri-t-butylamine, tri-i-propylamine, tricyclohexylamine, tribenzylamine, trimethylamine, tri-n-butylamine, tri-n-pentylamine, tri-n-hexylamine and tri-n-heptylamine.

6. The acrylic rubber composition according to claim 1, wherein the polyamine compound is an aromatic polyamine represented by formula (2):

$$H_2N\text{-Ph-M-Ph-}NH_2 \quad (2)$$

where M is O, S, $SO_2$, CONH or O—R—O; R in O—R—O is Ph, Ph-Ph, Ph-$SO_2$-Ph, $(CH_2)_m$ (wherein m is from 3 to 5, Ph-$CH_2$—$C(CX_3)_2$—$CH_2$-Ph where X is H or F or $(CH_2)C(CH_3)_2(CH_2)$; and Ph is a benzene ring.

7. The acrylic rubber composition according to claim 1, wherein the polyamine compound is at least one selected from the group consisting of an aromatic polyamine of 4,4'-bis(4-aminophenoxy)biphenyl, 4,4'-diaminodiphenylsulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide or bis[4-(4-aminophenoxy)phenyl]sulfone; and an aliphatic polyamine of hexamethylenediamine, hexamethylenediamine carbamate, N,N'-dicinnamylidene-1,6-hexanediamine, diethylenetriamine, triethylenetetramine or tetraethylenepentamine.

8. A vulcanized product obtained by vulcanizing the acrylic rubber composition as defined in claim 1.

9. A rubber hose comprising the vulcanized product as defined in claim 8.

10. A sealing article comprising the vulcanized product as defined in claim 8.

11. A rubber vibration insulator comprising the vulcanized product as defined in claim 8.

* * * * *